United States Patent
Kim et al.

(10) Patent No.: US 6,620,261 B2
(45) Date of Patent: Sep. 16, 2003

(54) FLUX CORED WIRE FOR DUAL PHASE STAINLESS STEEL

(76) Inventors: Jong-won Kim, 58-2, Sungju-dong, Changwon City, Kyoungnam (KR); Sunil Lee, 58-2, Sungju-dong, Changwon City, Kyoungnam (KR)

(*) Notice: Subject to any disclaimer, the term of this patent is extended or adjusted under 35 U.S.C. 154(b) by 0 days.

(21) Appl. No.: 09/917,190

(22) Filed: Jul. 27, 2001

(65) Prior Publication Data

US 2002/0148533 A1 Oct. 17, 2002

(30) Foreign Application Priority Data

Jul. 28, 2000 (KR) .......................... 2000-43858

(51) Int. Cl.$^7$ ............................. B23K 35/363
(52) U.S. Cl. .......................... 148/24; 148/23
(58) Field of Search ...................... 148/23, 24

(56) References Cited

U.S. PATENT DOCUMENTS 6,340,396 B1 * 1/2002 Ogawa et al. ............ 148/23

* cited by examiner

Primary Examiner—Daniel J. Jenkins
(74) Attorney, Agent, or Firm—Law Office of Marc D. Machtinger, Ltd.

(57) ABSTRACT

Flux cored wire for dual stainless steel having flux filled into a stainless steel sheath of the invention, the flux contains, with respect to the total weight of the wire: 0.02 to 0.10 wt % C; 0.10 to 1.0 wt % Si; 1.0 to 3.0 wt % Mn, 15 to 35 wt % Cr, 7.0 to 12.0 wt % Ni; 1.5 to 3.5 wt % Mo, 0.02 to 0.2 wt % N; 0.02 to 0.2 wt % Nb; and 0.5 to 5.6 wt % slag forming agent. The components composing the flux cored wire satisfy the following equations of: $1.5 \leq \{(Cr+Mo+1.5Si+0.5Nb)/(Ni+0.5Mn+30C+30N)\} \leq 2.3$ and $25 \leq PREN (Cr+3.3Mo+16N) \leq 45$. The welding wire of the invention forms the suitable weld metal in welding the dual phase structure stainless steel instead of the single phase steel so that remarkable effects can be expected in welding equipments of the sea water resistant austenitic-ferritic stainless steel which are used for various apparatuses for the chemical industry.

1 Claim, 2 Drawing Sheets

FLUX CORED WIRE FOR DUAL PHASE STAINLESS STEEL

BACKGROUND OF THE INVENTION

1. Field of the Invention

The present invention relates to a welding wire used for welding dual phase stainless steel, and more particularly, a flux cored wire which can form a welding zone excellent in weldability, crack resistance, stress-corrosion cracking resistance and pitting resistance in welding austenitic and ferritic stainless steel that is used in various apparatuses for the chemical industry such as a condenser pipe where the sea water is used as cooling water, a heat exchanger for the petroleum chemistry, an oil well pipe, etc.

2. Description of the Related Art

Stainless steel is a kind of alloyed steel where Cr is added into steel to enhance the corrosion resistance, and is mainly classified into Cr based steel and Cr—Ni based steel according to composition and classified into five categories such as martensitic stainless steel, ferritic stainless steel, austenitic stainless steel, austenitic-ferritic stainless steel and precipitation hardening stainless steel according to metal structure.

The martensitic and ferritic stainless steels are Cr based stainless steel, in which martensitic stainless steel with 13 Cr stainless steel as the representative one has corrosion resistance and heat resistance to be widely used as general machine structural steel, and ferritic stainless steel with 18 Cr stainless steel as the representative one is poor in mechanical properties since material quality cannot be enhanced via heat treatment. However the ferritic stainless steel is easy in welding due to having no hardenability, has ferromagnetic properties of the BCC structure, and is excellent in formability thus widely used in household articles or vehicle parts.

The austenitic stainless steel is a Cr—Ni based stainless where 18-8 stainless steel is the representative one. The austenitic stainless steel is an industrially fundamental stainless steel which shows nonmagnetic properties of the FCC structure and is excellent in toughness, ductility and corrosion resistance, and from which variously enhanced steels are being developed.

The precipitation hardened stainless steel, where precipitation hardening elements are doped into the Cr—Ni based stainless steel to enhance the strength while reducing the deformation due to the hardening heat treatment, is used for machine parts such as corrosion resistant spring, shaft, valve and impeller where good formability and high strength are necessary.

Also, the austenitic-ferrite based dual stainless steels contain 20 to 25 wt % Cr and 4 to 8 wt % Ni where Mo, Cu, N, etc. is added individually or as a mixture thereof to obtain the microstructure of a base matrix having 50 to 80 wt % ferrite and balancing amount of austenite and are excellent in sea water resistance and intergranular corrosion resistance to be widely used for various chemical industries where corrosion prevention against the sea water is necessary.

It has been relatively currently studied and developed about the dual phase stainless steel in order to enhance resistance against pitting and intergranular corrosion which are the disadvantages of the austenitic stainless steel while obtaining the advantages of the ferritic stainless steel of strong resistance against stress corrosion.

When the dual phase stainless steel contacts with an aqueous solution containing halogen ions such as $Cl^-$, $F^-$, etc., since there is a disadvantage that the halogen ions are absorbed to a passive state film(a tight adherent film of iron-chromium oxide) defect formed on the stainless steel surface so that the passive state film defect is destroyed to elute the metal and thus generate a pitting, that is why the welding zone properties are especially important.

However, there are problems that welding wires for austenitic stainless steel of the related art are poor in weldability to the dual phase stainless steel and have a difficulty in obtaining a welding zone corresponding to the properties of the dual phase stainless steel.

SUMMARY OF THE INVENTION

The present invention is proposed to solve several problems which are generated in welding a dual phase stainless steel by using a welding wire for stainless steel of the related art and therefore it is an object of the invention to provide a flux cored wire for welding the dual phase stainless steel in which a welding zone can be obtained that is high in strength and excellent in crack resistance, stress-corrosion cracking resistance and pitting resistance.

BRIEF DESCRIPTION OF THE DRAWINGS

FIG. 1A to FIG. 1C show a welding position, wherein:

FIG. 1A is a sectional view of a welding zone that is flat welding;

FIG. 1B is a conceptional view for showing a horizontal fillet welding, and

FIG. 1C is a conceptional view for showing an vertical-up welding.

DETAILED DESCRIPTION OF THE PREFERRED EMBODIMENT

Figure 1A:
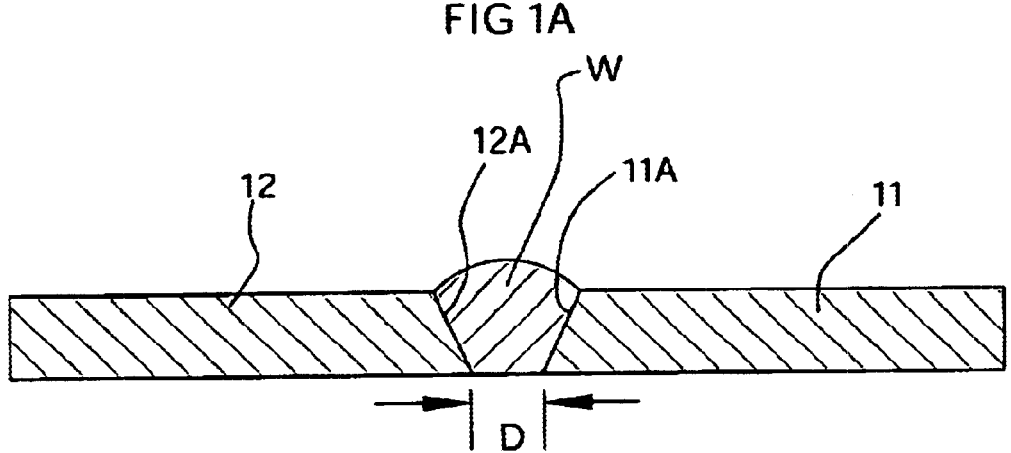

The foregoing object of the invention is realized by filling a flux containing C, Si, Mn, Cr, Ni, Mo, N, Nb, etc. into an austenitic or austenitic-ferritic stainless steel sheath with the amount of 15 to 35 wt % about the total weight of the wire.

Here, the amount of the flux is about 15 to 35 wt % of the total weight of the welding wire since the amount of the flux under 15 wt % causes the generated amount of a slag for covering the outer surface of beads to be insufficient and the amount of flux over 35 wt % causes the generated amount of the slag to be excessive and the welding, wire to be easily bent due to the dead load of the flux during feeding thereby lowering the feeding rate.

In the flux cored wire for dual stainless steel having flux filled into a stainless steel sheath of the invention, the flux contains, with respect to the total weight of the wire: 0.02 to 0.10 wt % C; 0.10 to 1.0 wt % Si; 1.0 to 3.0 wt % Mn; 15 to 35 wt % Cr; 7.0 to 12.0 wt % Ni; 1.5 to 3.5 wt % Mo, 0.02 to 0.2 wt % N; 0.02 to 0.2 wt % Nb; and 0.5 to 5.6 wt % slag forming agent.

Also, the flux components consisting of the flux cored wire of the invention satisfy the foregoing content ranges and the following Equation 1 and 2 at the same time:

$$1.5 \leq \{(Cr+Mo+1.5Si+0.5Nb)/(Ni+0.5Mn+30C+30N)\} \leq 2.3 \quad \text{Equation 1,}$$

and $$25 \leq PREN \leq 45 \quad \text{Equation 2,}$$

wherein PREN (Pitting Resistance Equivalent Number)= (Cr+3.3 Mo+16N).

Equation 1 is obtained by using Cr, Ni equivalent weight yielding equation of Schaeffler diagram to obtain a weld metal of high strength and toughness such as a base metal. When the value of the equation is under 1.5, the weld metal is solidified in the austenite phase so that the hot cracking sensitivity index tends to be high and a suitable strength cannot be obtained. When the value is over 2.3, ferrite contents is increased to lower the toughness.

PREN in equation 2 is the numerical value for enabling judgement of the pitting resistance, which shows poor corrosion resistance in the air or aqueous solution under the value of 25 while showing sensitivity to the hot cracking since the toughness decreases even though the corrosion resistance increases over the value of 45.

Under the condition to satisfy the foregoing Equation 1 and 2, functions of the flux consisting a flux cored wire of the present invention will be represented as follows according to component.

C is the most basic component to increase the strength of a weld metal and an element for generating austenite. The C weakens strength increase and austenite generation effect with the content thereof under 0.02 wt %, and remarkably decreases the corrosion resistance and the toughness of the weld metal with the content thereof over 0.10 wt %.

Si is effective as an element for generation of slag and strengthening the weld metal. However, it is not preferable since a suitable strength is not obtained under 0.1 wt % and the toughness decrease effect is larger than the strength increase effect over 1.0 wt %.

Mn adjusts the microstructure of the weld metal to assist the generation of austenite. However, since the maximum effect can be obtained at 3 wt %, it is preferable to set the upper limit at 3 wt %.

Cr should be contained at least 15 wt % to ensure the corrosion resistance and strength of the weld metal. The content of Cr is preferably 15 to 35 wt % since the generation of martensite structure for ensuring strength is degraded with the content over 35 wt %.

Ni is an element for stably generating austenite microstructure to enhance the corrosion resistance and toughness of the weld metal. The toughness is insufficient with content thereof under 7.0 wt %. With the content over 12.0 wt %, an austenite fraction rate is excessive so that the strength tends to decrease and the toughness increase effective is almost saturated. Therefore, the upper limit is set at 12 wt %.

Mo is a component necessary for ensuring the corrosion resistance and high strength of the weld metal and enhancing the hot softening resistance thereof. With the content under 1.5 wt %, the effect is not sufficient. With the content over 3.5 wt %, intermetallic compounds are generated in the structure of the weld metal so that the toughness is lowered and the fragility about brittle fracture is increased.

Nb is an element for stabilizing ferrite. With the content at least 0.02 wt %, carbide in the ferrite structure is stabilized to prevent C from displacement so that the pitting ability is enhanced. However, with the content over 0.2 wt %, hot cracking can be caused. Therefore, the upper limit is preferably set at 0.2 wt %.

N is an element for enhancing the tensile strength of the weld metal while being effective for generation of ferrite. With the content under 0.02 wt %, effect thereof is not sufficient. With the content over 0.2 wt %, the toughness is decreased to lower the impact value. Also, since welding pores and age hardening are caused, the upper limit is set as 0.2 wt %.

As considered above, the flux consisting of the foregoing components and other slag forming agent is filled into the austenitic-ferritic stainless steel sheath at 15 to 35 wt % about the total weight of the wire to manufacture the flux core wire of the invention. Here, the slag forming agent consists of $SiO_2$, $TiO_2$, $ZrO_2$, $Al_2O_3$, $K_2O$, etc., and is contained at 0.5 to 5.6 wt % about the total weight of the wire, so that the formation of the slag and weldability can be ensured.

Also, the stainless steel sheath is used so that the chemical component of the weld metal is as similar as possible to the base metal.

The flux cored wire according to an embodiment of the invention and a flux cored wire of a comparative example are manufactured based upon the component of the flux described as above. The chemical components of the sheath metal are shown in Table 1, and the chemical components of the flux are shown in Table 2.

TABLE 1

| | Classification | | | | | | | |
|---|---|---|---|---|---|---|---|---|
| | C | Si | Mn | P | S | Cr | Ni | Mo | N |
| wt % | 0.022 | 0.46 | 1.05 | 0.013 | 0.008 | 18.5 | 8.8 | 0.03 | 0.002 |

TABLE 2

| Classification | | C | Si | Mn | Cr | Ni | Mo | N | C* | D* | E* |
|---|---|---|---|---|---|---|---|---|---|---|---|
| | | \multicolumn{10}{c|}{Percentage to Total Wire Weight (wt %)} |
| A* | 1 | 0.048 | 0.34 | 1.74 | 22.0 | 9.2 | 2.00 | 0.07 | 0.7 | 1.80 | 29.72 |
| | 2 | 0.052 | 0.77 | 1.77 | 23.0 | 8.8 | 2.20 | 0.08 | 0.8 | 1.93 | 31.54 |
| | 3 | 0.055 | 0.22 | 1.60 | 22.5 | 8.5 | 3.03 | 0.08 | 2.2 | 1.94 | 33.78 |
| | 4 | 0.037 | 0.28 | 1.45 | 22.5 | 8.2 | 1.75 | 0.09 | 2.8 | 1.94 | 29.72 |
| | 5 | 0.033 | 0.31 | 1.53 | 21.8 | 10.0 | 2.49 | 0.06 | 3.4 | 1.83 | 30.98 |
| | 6 | 0.054 | 0.47 | 1.66 | 28.2 | 9.8 | 2.27 | 0.07 | 0.9 | 2.18 | 36.82 |
| | 7 | 0.063 | 0.36 | 1.84 | 24.5 | 8.5 | 3.05 | 0.08 | 4.8 | 2.05 | 35.88 |
| | 8 | 0.030 | 0.54 | 1.33 | 25.0 | 8.8 | 2.07 | 0.09 | 5.1 | 2.13 | 33.27 |
| | 9 | 0.028 | 0.37 | 1.62 | 25.6 | 9.0 | 2.15 | 0.07 | 3.3 | 2.22 | 33.81 |
| | 10 | 0.060 | 0.35 | 1.70 | 18.0 | 9.2 | 0.50 | 0.08 | 1.1 | 1.33 | 20.93 |
| | 11 | 0.063 | 0.37 | 1.80 | 17.5 | 9.2 | 1.10 | 0.08 | 1.8 | 1.33 | 22.49 |
| | 12 | 0.070 | 0.45 | 2.32 | 16.5 | 9.5 | 1.65 | 0.09 | 1.5 | 1.22 | 23.38 |
| | 13 | 0.060 | 0.17 | 2.27 | 17.7 | 9.1 | 1.50 | 0.10 | 2.1 | 1.29 | 24.25 |
| | 14 | 0.055 | 0.25 | 2.88 | 18.2 | 8.9 | 1.80 | 0.15 | 0.8 | 1.24 | 26.50 |
| | 15 | 0.065 | 0.37 | 1.65 | 33.0 | 9.2 | 3.50 | 0.07 | 1.4 | 2.63 | 45.67 |
| | 16 | 0.100 | 0.62 | 1.72 | 17.2 | 9.8 | 1.80 | 0.08 | 2.2 | 1.21 | 24.42 |
| | 17 | 0.071 | 0.46 | 1.35 | 17.3 | 9.5 | 1.50 | 0.13 | 1.8 | 1.25 | 24.33 |
| | 18 | 0.054 | 0.27 | 1.20 | 17.6 | 9.0 | 1.70 | 0.11 | 3.3 | 1.44 | 24.97 |

A*: Embodiments of the invention,
B*: Comparative examples
C*: Nb and other components
D*: Value of Equation 1
E*: Value of Equation 2

Flux cored wires where the components of Table 2 are filled into the sheath of Table 1 are used in welding a dual stainless steel having components shown in Table 3 under welding conditions as shown in Table 4.

In the case of comparative wires of the related art, other components except Mo are mostly within the reference range of the invention but do not satisfy Equation 1 and 2.

TABLE 3

| | C | Si | Mn | P | S | Cr | Ni | Mo | N |
|---|---|---|---|---|---|---|---|---|---|
| wt % | 0.04 | 0.53 | 1.22 | 0.018 | 0.007 | 22.32 | 9.02 | 0.4 | 0.002 |

TABLE 4

| Welding Wire Diameter | 1.2 mm | | |
|---|---|---|---|
| Shielded Gas | 100 vol wt % CO2 or 80 vol wt % Ar + 20 vol wt % CO2, 20 l/min | | |
| Welding Position | Flat | Horizontal Fillet | Vertical-up |
| Welding Current (A) | 180~220 | 190~220 | 180~190 |
| Welding Voltage (V) | 28~30 | 28~30 | 28 |
| Welding Rate (cm/min.) | 25~30 | 25~30 | 10 |
| Welding Heat Input (KJ) | 12.1~13.2 | 12.7~13.2 | 31.9 |

Figure 1B:
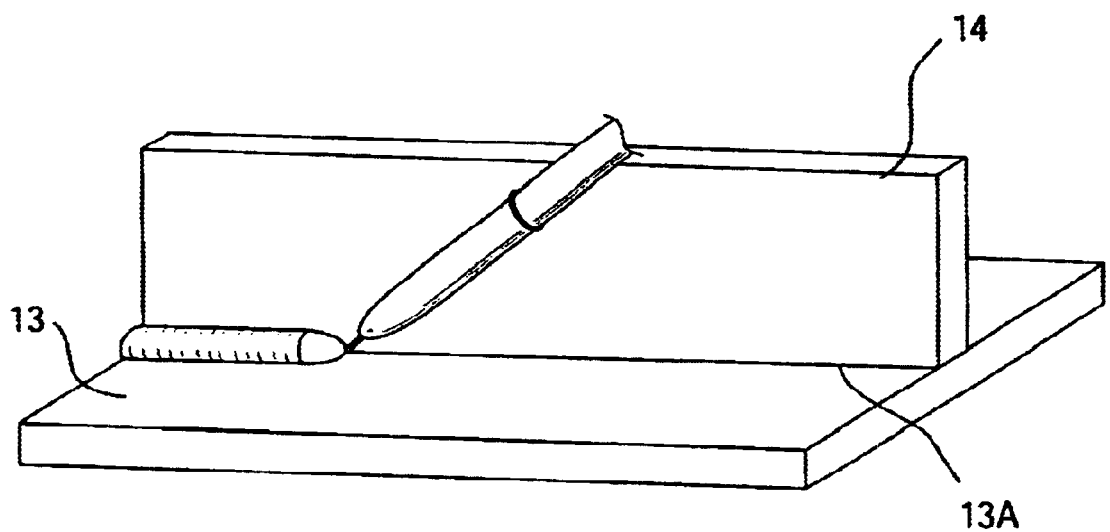
Figure 1C:
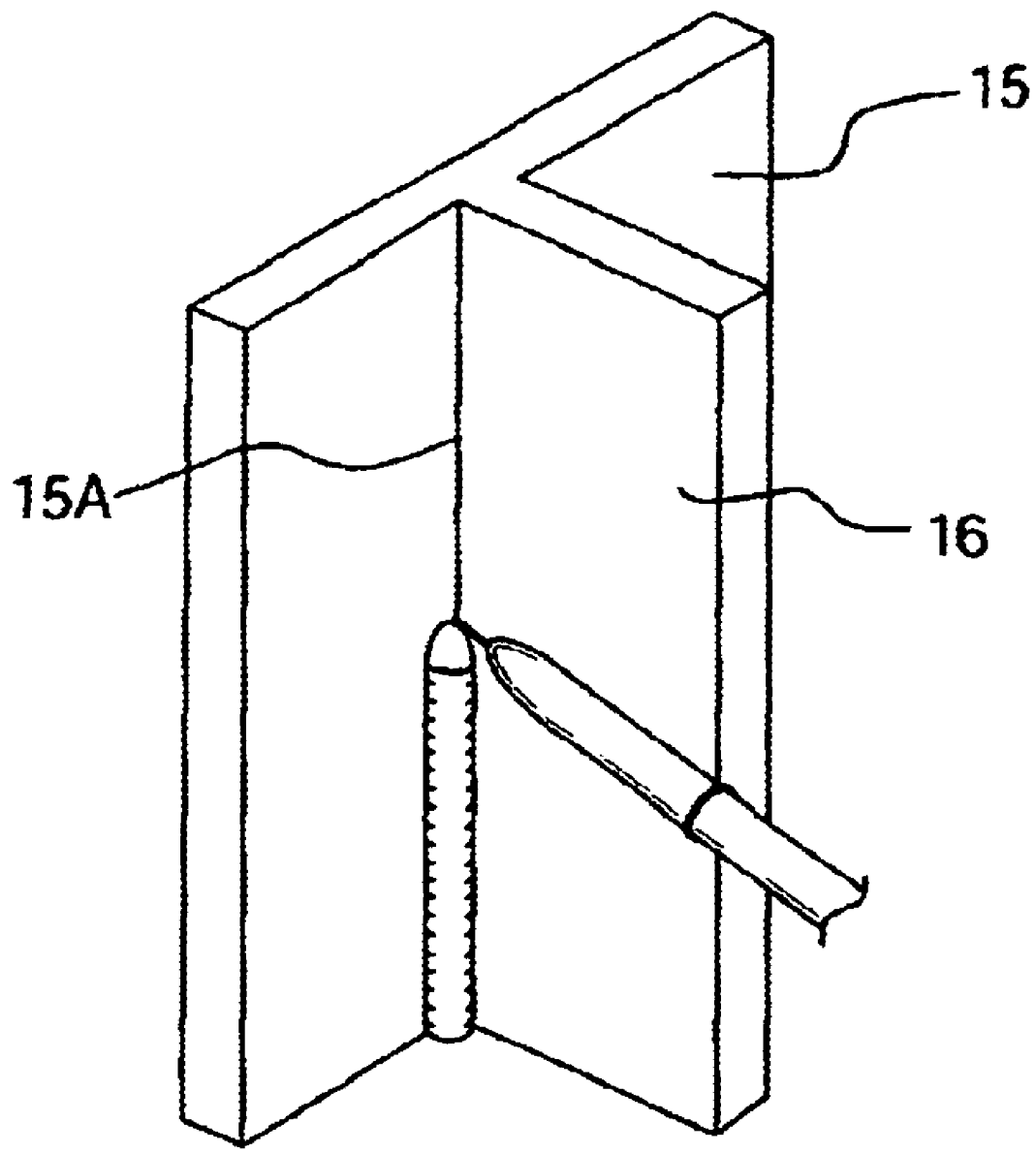

The welding positions of Table 4 are described in detail in FIGS. 1A to 1C. In a flat welding, a root opening D is formed between two base metals 11 and 12 subject to welding and then a weld metal W is formed between two beveled welding, surfaces (groove faces) 11A and 12A. In a horizontal fillet welding, a welding member 14 is vertically stationed on the upper side of a flat base metal 13 placed on the floor and then the welding is performed along a contact line 13A. In an vertical-up welding, a welding member 16 is perpendicularly contacted to one side of a flat base metal 15 which is stood vertically on the ground and then the welding is performed upward along a contact line 15A.

After welding as above, workabilities of welding about each of the flux cored wires are shown in Table 5.

TABLE 5

| Classification | | Arc Stability | Amount of Spatter | Slag Fluidity | Slag Detachability | Bead Appearance | Vertical-up Weldability |
|---|---|---|---|---|---|---|---|
| A* | 1 | ◉ | ◉ | ○ | ◉ | ○ | ○ |
| | 2 | ◉ | ◉ | ◉ | ○ | ◉ | ○ |
| | 3 | ◉ | ◉ | ◉ | ◉ | ◉ | ○ |
| | 4 | ◉ | ○ | ◉ | ◉ | ◉ | ○ |
| | 5 | ◉ | ◉ | ◉ | ○ | ○ | ○ |
| | 6 | ◉ | ○ | ◉ | ○ | ○ | ○ |
| | 7 | ◉ | ○ | ○ | ○ | ◉ | ○ |
| | 8 | ◉ | ◉ | ◉ | ◉ | ◉ | ○ |
| | 9 | ◉ | ◉ | ◉ | ◉ | ○ | ○ |
| B* | 10 | ◉ | ○ | ○ | ○ | △ | △ |
| | 11 | ◉ | ○ | ○ | △ | △ | △ |
| | 12 | ○ | △ | ○ | ◉ | △ | △ |
| | 13 | ○ | △ | △ | ○ | △ | △ |
| | 14 | ○ | △ | △ | ○ | △ | △ |
| | 15 | ○ | ○ | ○ | △ | ○ | △ |
| | 16 | ◉ | ○ | ○ | △ | △ | △ |
| | 17 | ○ | △ | △ | △ | △ | △ |
| | 18 | ○ | △ | △ | △ | △ | △ |

A*: Embodiments of the invention
B*: Comparative examples

From Table 2 to 5, it can be seen that comparative examples of the related art do not satisfy Equation 1 and 2 in particular and thus have the overall weldabilities poorer than those of the embodiments of the invention.

TABLE 6

| Classification | | Tension Test | Charpy Impact Test | | Pitting Test | |
|---|---|---|---|---|---|---|
| | | | −20° C. | −40° C. | Corrosion Loss (g/mm².h) | Evaluation |
| A | 1 | ○ | good | good | 0.06 | good |
| | 2 | ○ | good | good | 0.08 | good |
| | 3 | ○ | good | good | 0.08 | good |
| | 4 | ○ | good | good | 0.04 | good |
| | 5 | ○ | good | good | 0.03 | good |
| | 6 | ○ | good | good | 0.08 | good |
| | 7 | ○ | good | good | 0.04 | good |
| | 8 | ○ | good | good | 0.02 | good |
| | 9 | ○ | good | good | 0.02 | good |
| B | 10 | ○ | good | bad | 0.13 | bad |
| | 11 | X | bad | bad | 0.15 | bad |
| | 12 | X | bad | bad | 0.18 | bad |
| | 13 | X | bad | bad | 0.16 | bad |
| | 14 | ○ | good | bad | 0.14 | bad |
| | 15 | X | bad | bad | 0.05 | good |
| | 16 | X | bad | bad | 0.22 | bad |
| | 17 | ○ | bad | bad | 0.20 | bad |
| | 18 | X | bad | bad | 0.18 | bad |

Tension test is performed after specimens are heat treated at about 200° C. for one hour according to JIS Z 3111, wherein 'O' indicates fracture of the base metal and 'X' indicates fracture of the welding zone.

Charpy Impact Test is performed at least three times at each temperature to the specimens. The test results are decided as bad or defective if the mean value is at most 27J.

Pitting test is processed according to JIS G 0578 and then specimens are collected for pitting test and evaluation of a corrosion loss. It is Judged good if the corrosion loss is under 0.1 g/mm² ∎h, and poor if at least the same.

As can be seen from Table 6, the weld metal from the wires of the comparative examples have strength, shock resistance and pitting resistance poorer than those of the embodiments of the invention since they fail to satisfy Equation 1 and 2 while lacking Mo contents (in the comparative examples 10 and 11), or showing the lower limit (in the comparative examples 13 and 17) or the upper limit (in the comparative example 15).

As described hereinbefore, the welding wire of the invention forms the suitable weld metal in welding the dual phase structure stainless steel instead of the single phase steel so that remarkable effects can be expected in welding of the sea water resistant austenitic-ferritic stainless steel which are used for various equipments for the chemical industry.

What is claimed is:

1. Flux cored wire for dual stainless steel having flux filled into a stainless steel sheath, said flux containing, with respect to the total weight of the wire: 0.02 to 0.10 wt % C; 0.10 to 1.0 wt % Si; 1.0 to 3.0 wt % Mn; 15 to 35 wt % Cr; 7.0 to 12.0 wt % Ni; 1.5 to 3.5 wt % Mo; 0.02 to 0.2 wt % N; 0.02 to 0.2 wt % Nb; and 0.5 to 5.6 wt % slag forming agent, wherein the components of said flux satisfy the following equations 1 and 2:

$$1.5 \leq \{(Cr+Mo+1.5Si+0.5Nb)/(Ni+0.5Mn+30C+30N)\} \leq 2.3 \quad (1)$$

and $$25 \leq PREN \geq 45 \quad (2).$$

wherein PREN (Pitting Resistance Equivalent Number)= (Cr+3.3Mo+16N), and said flux is filled into the stainless steel sheath at 15 to 35 wt % in respect to the total weight of the wire.

* * * * *

UNITED STATES PATENT AND TRADEMARK OFFICE
CERTIFICATE OF CORRECTION

PATENT NO. : 6,620,261 B2
DATED : September 16, 2003
INVENTOR(S) : Jong-won Kim and Sunil Lee It is certified that error appears in the above-identified patent and that said Letters Patent is hereby corrected as shown below:

Column 6,
Line 34, "0.1g/mm² ■ h" should read -- 0.1g/mm² · h --.
Line 61, "25 ≤ PREN ≥ 45" should read -- 25 ≤ PREN ≤ 45 --.

Signed and Sealed this

Third Day of February, 2004

JON W. DUDAS
*Acting Director of the United States Patent and Trademark Office*